US006346582B1

(12) United States Patent
Kooijmans et al.

(10) Patent No.: US 6,346,582 B1
(45) Date of Patent: Feb. 12, 2002

(54) GLYCIDATION OF CARBOXY POLYESTER AND TERTIARY C MONOCARBOXYIC ACID (GLYCIDYL ESTER)

(76) Inventors: Petrus Gerardus Kooijmans; Eric Johannes Vos, both of Badhuisweg 3, CM Amsterdam (NL); Michael James Watkins, Avenue Jean Monnet 1, B-1348 Ottignies, Louvain-la-Neuve (BE)

( * ) Notice: Subject to any disclaimer, the term of this patent is extended or adjusted under 35 U.S.C. 154(b) by 20 days.

(21) Appl. No.: 09/607,062

(22) Filed: Jun. 29, 2000

Related U.S. Application Data

(62) Division of application No. 09/286,781, filed on Apr. 6, 1999, now Pat. No. 6,121,389.

(30) Foreign Application Priority Data

Apr. 7, 1998 (EP) .............................................. 98201089
May 4, 1998 (EP) .............................................. 98201422

(51) Int. Cl.[7] ........................ C08G 63/06; C08G 63/46; C08L 63/00; C08L 67/04
(52) U.S. Cl. ........................ 525/437; 525/423; 525/444; 528/297
(58) Field of Search ................................ 525/437, 423, 525/444; 528/297

(56) References Cited

U.S. PATENT DOCUMENTS 5,869,191 A    2/1999   Van Gaalen ................ 525/437

FOREIGN PATENT DOCUMENTS

| EP | 0447360 A2 | 3/1991 |
| EP | 0634434 A2 | 7/1994 |
| EP | 0720997 A2 | 7/1996 |
| WO | WO 96/11238 | 10/1995 |

OTHER PUBLICATIONS

"Cardura E10 as a Reactive Diluent for Epoxy Resins," Technical Bulletin CM 5,1, Re-issued Dec. 1996.

Chemical Abstracts Accession No. 1977:44820, Martin for Tech. Serv. Lab., Amoco Chem., FATIPEC Congr. vol. 13, 1976, pp. 418–427.

*Primary Examiner*—Robert E. L. Sellers

(57) ABSTRACT

Compositions prepared by the glycidation of at least one (a) carboxy polyfunctional polyester and at least one (b) α,α-branched monocarboxylic acid containing a tertiary carbon atom and from 5 to 12 carbon atoms, or a glydicyl ester thereof, a curing agent and, optionally, a catalyst, and coating and or casting compositions containing them.

12 Claims, No Drawings

GLYCIDATION OF CARBOXY POLYESTER AND TERTIARY C MONOCARBOXYIC ACID (GLYCIDYL ESTER)

This is a division application Ser. No. 09/286,781 filed Apr. 6, 1999, U.S. Pat. No. 6,121,389, the entire disclosure of which is hereby incorporated by reference.

The present invention relates to low viscosity compositions of epoxy functional polyester resins, to the use of said compositions for coating applications and non-coating applications, and to processes for the preparation of said compositions.

Several types of polyglycidylester resins, obtainable by glycidating carboxyl functional polyester resin precursors and coating compositions comprising them are known from e.g. EP-A-447360, WO 96/11238, EP-A-0634434, EP-A-0720997.

In these publications carboxyl functional polyesters, derived from specific polycarboxylic acids and polyhydroxy group containing compounds, and their glycidated derivatives, were used in combination with each other or with other structurally different epoxy resins or polyesters respectively in coating compositions, and more in particular powder coating compositions.

Although the linear polyfunctional aliphatic carboxyl polyester resins and the corresponding polyglycidylesters derived therefrom, provided progress towards the modern requirements of outdoor durability (UV stability) and resistance against hydrolysis of the final coating compositions in the cured state, there still exists a need for further improvement of the properties of the coating compositions.

Moreover there has been a growing need for compositions comprising polyglycidylesters that show on the one hand a sufficient epoxy functionality to enable a quick and efficient curing reaction (which may take place in a temperature range from 10 to 260° C. dependent on the specific type of curing agent) and on the other hand a sufficiently low viscosity to enable a fast processability into end use applications, with minimal and preferably no emissions of solvent, and with no emission of toxic reaction products.

Therefore, it is desirable to provide compositions comprising at least one polyglycidylester prepared from carboxyl functional polyesters, is which have the combination of relatively high epoxy functionality and sufficiently low viscosity that provide attractive outdoor durable properties in the final compositions.

It is further desirable to obtain an end-use application composition of such composition which can be cured at temperatures in the range of from 10 to 260° C.

Accordingly, a composition is provided prepared by glycidation of at least one (a) carboxy polyfunctional polyester and at least one (b) α, α-branched monocarboxylic acid containing a tertiary carbon atom and from 5 to 20 carbon atoms and preferably from 5 to 12 carbon atoms, or a glycidyl ester thereof. In general said compositions have an EGC from 2000 to 4000.

Preferred compositions will have an EGC in the range from 3000 to 4000.

More preferably, components (b) are used, containing a tertiary carbon atom and containing from 5 to 10 carbon atoms. Most preferably VERSATIC acids (VERSATIC is a trademark) from Shell Chemical Company or CARDURA glycidyl esters (of VERSATIC acids) from Shell Chemical Company are used (CARDURA is a trademark).

The weight ratio between carboxyl polyfunctional polyester or polyglycidyl ester thereof (a) and α,α-branched monocarboxylic acid or glycidyl ester thereof (b) may vary in the range from 19:1 to 1:1 and preferably from 6:1 to 2:1.

It will be appreciated that the compositions according to the present invention can be prepared from starting mixtures comprising component (a) as such or from starting mixtures comprising the constituents of the carboxy polyfunctional polyester to be formed in an initial step.

In general, the compositions of the present invention can be prepared according to a process as follows:

I. mixing the constituents of the carboxy polyfunctional polyester to be formed (a) and the α, α-branched monocarboxylic acid as specified hereinbefore (b) and preparing the desired carboxy polyfunctional polyester by known esterification methods, preferably by azeotropic condensation, at temperatures in the range of from 100 to 220° C. and preferably from 160 to 220° C., during a period of from 2 to 8 hours, followed by glycidation of the mixture obtained with epihalohydrin and preferably epichlorohydrin.

II. mixing the constituents of the carboxy poly-functional polyester to be formed (a) and preparing the desired carboxy functional polyesters, as specified under I, addition of the α, α-branched monocarboxylic acid to obtained polyester, followed by glycidation of the mixture.

III. mixing the constituents of the carboxy polyfunctional polyester to be formed (a) and preparing said desired carboxy polyfunctional polyester, as specified hereinbefore, and glycidation of said obtained polyester with a mixture of epihalohydrin and the glycidyl ester of α, α-branched monocarboxylic acid.

IV. mixing the constituents of the carboxy polyfunctional polyester to be formed (a) and preparing the desired carboxy polyfunctional polyester, as specified hereinbefore, and glycidation with epihalohydrin to obtain the corresponding polyglycidyl ester, and dilution of the polyglycidyl ester with the glycidyl ester of α, α-branched monocarboxylic acid.

The compositions so obtained surprisingly have been found to show a combination of a sufficiently high epoxy functionality (Ep Fav 1.5–3.5) necessary for a fast curing into outdoor durable (coating) layers or formed products, and an attractive low viscosity (in the range of from 1–15 Pa.s and preferably from 1 to 10 Pa.s), enabling in addition a fast processing.

These results could certainly not be predicted or even expected by an average person skilled in the art, in view of Technical Bulletin, Shell Chemicals, CM 5.1, July 1996, actually disclosing only blends of bifunctional epoxy resins and CARDURA glycidyl esters, having a decreased epoxy functionality below 2, and showing poor outdoor durable properties.

As component (a) in the compositions of the present invention, a great variety of linear or branched carboxy polyfunctional polyesters, can be used.

More in particular suitable starting carboxy polyfunctional polyesters can be prepared by reaction of:

(i) at least one aromatic, aliphatic or cycloaliphatic dicarboxylic acid, and preferably aliphatic or cycloaliphatic dicarboxylic acid (B), and (ii) at least one dihydroxymonocarboxylic acid compound (C), comprising a tertiary aliphatic carboxyl group and two aliphatic hydroxyl groups, which may each independently be primary or secondary hydroxyl, and (iii) optionally one diol compound (D) comprising two aliphatic hydroxyl groups which may each independently be a primary or a secondary hydroxyl group, and (iv) optionally an alcohol compound (A') comprising one monofunctional primary or secondary hydroxyl group and/or an alcohol compound (A"), comprising one primary or secondary hydroxyl group and one tertiary aliphatic carboxyl group, and (v) optionally a trifunctional hydroxy compound (E), comprising three aliphatic hydroxyl groups which may each independently be a primary or secondary hydroxyl group, (vi) optionally a tetrafunctional hydroxy compound (F), comprising four aliphatic hydroxyl groups, which may each independently be a primary or a secondary hydroxyl group, the molar ratio of compound A':A":B:C:D:E:F being M:N:X+Y+2P+3Q+1:X:Y:P:Q wherein M+N=0–4
Y ranges from 0 to 5,
X ranges from 1 to 8,
P ranges from 0 to 2, and
Q ranges from 0 to 1 at a temperature within the range of from 100 to 220° C. and preferably from 160 to 220° C., during a period of from 2 to 8 hours and preferably from 6 to 8 hours.

The reaction is continued until essentially all the hydroxyl groups initially present in the reaction mixture have been esterified.

For the preparation of the starting carboxy polyfunctional polyesters, a condensation reaction is carried out after charging all constituents A to F, and optionally a (non reacting or only slowly reacting) VERSATIC acid component, simultaneously to the reactor, whereafter the temperature is increased to a temperature in the range of from 100 to 220° C. This temperature is maintained over a period of from 2 to 8 hours, thus allowing the reaction to proceed under continuous removal of water by means of the use of an azeotropic solvent or by means of vacuum, and preferably by means of azeotropic removal. The reaction is continued until a reaction product is obtained which has an acid value, which corresponds to the theoretical acid value as referred to.

An esterification catalyst known in the art, such as for example dibutyltinoxide, paratoluenesulfonic acid, tinoctoate, zincoctoate and lithiumricinoleate may be used in the esterification process but is in general not required.

Suitable compounds A' for use in the process of the present invention are aliphatic and cycloaliphatic alcohols having one primary or one secondary hydroxyl group and having a boiling point of over 150° C. at atmospheric pressure, such as for example cyclohexanol and cycloheptanol.

Suitable compounds A" are aliphatic and cycloaliphatic alcohols having one primary or one secondary hydroxyl group and having in addition one tertiary aliphatic carboxyl group such as for example cyclohexane-1-methyl-4-hydroxy carboxylic acid the 1:1 (molar ratio) reaction product of dimethylolpropionic acid and cyclohexanecarboxylic acid, and hydroxypivalic acid. Hydroxypivalic acid is a particularly preferred compound A".

Suitable compounds B for use in the process of the present invention are difunctional acids, for example dodecanedioic acid, cyclobutanedicarboxylic acid, suberic acid, succinic acid, glutaric acid, azelaic acid, tetrahydrophthalic acid, hexahydrophthalic acid (HHPA), methylhexahydrophthalic acid, endomethylenetetrahydrophthalic acid, methylendomethylenetetrahydrophthalic acid, 1,4-cyclohexanedicarboxylic acid and 1,3-cyclohexanedicarboxylic acid or combinations thereof; the cyclohexanedicarboxylic acids being particularly preferred.

Suitable compounds C for use in the process of this invention contain two aliphatic hydroxyl groups and one carboxyl group.

A typical example is dimethylolpropionic acid.

Suitable compounds D for use in the process of the present invention include branched aliphatic-, cycloaliphatic-, or araliphatic compounds, containing two aliphatic hydroxyl groups, each individually being either a primary or a secondary hydroxyl group, such as for example propylene glycol, neopentyl-glycol, hydrogenated diphenylolpropane (HDPP), hydrogenated 4,4'-dihydroxydiphenyl, 1,4-cyclohexanedimethylol, 1,4-dihydroxycyclohexane, hydroxypivalylhydroxypivalate and 2-butyl-2-ethyl-1,3-propanediol or mixtures thereof. Hydrogenated diphenylol propane or 1,4-cyclohexane dimethylol is a preferred compound.

Suitable compounds E contain three aliphatic hydroxyl groups.

Examples include trimethylolethane (TME), trimethylolpropane (TMP), glycerol and the like.

Suitable compounds F contain four aliphatic hydroxyl groups.

Examples include pentaerythritol, di-TMP and the like.

As indicated hereinbefore, the linear or branched tertiary aliphatic carboxyl functional polyester resin prepared according to the process of the present invention can be easily converted to a polyglycidylester resin according to methods known in the art i.e. by reaction with an excess epihalohydrin in the presence of a suitable base and optional catalyst. Most conveniently epichlorohydrin is being used.

More preferably starting carboxylpolyfunctional polyesters are used derived from 1,4-dicarboxylcyclohexane and dimethylolpropionic acid, and optionally hydroxypivalic acid (HPA) and/or trimethyl propane or pentaerythrytol.

The terminal groups such starting polyesters may be derived from additional components other than those according to (i), (ii), (iii) and (iv), if desired. More preferably polyglycidyl ester resins are used, in the preceding polyester of which X ranges from 2 to 4, Y ranges from 0 to 1, P ranges from 0 to 2 or Q ranges from 0 to 1. More preferably P=1 or Q=1 in said starting polyesters.

It will be appreciated that another aspect of the present invention will be formed by the end use application of the hereinbefore specified compositions, together with curing agents and optionally a catalyst.

Such end use applications can be in the area of outdoor durable coatings, by spraying or immersing formed articles with the coating composition.

Accordingly another aspect of the present invention is formed by ready for use, curable coating compositions comprising the hereinbefore specified compositions, a curing agent and optionally a catalyst.

However also casting compositions of the present invention into shaped articles or construction, which can be cured, preferably at relatively low temperatures, forms an aspect of the present invention.

The curing of the compositions of the present invention can be performed by mixing it with a carboxyl polyfunctional polyester resin as specified hereinbefore and more preferably polyesters of the corresponding type, but can also be combined with polyacids such as 1,12-dodecanedioic acid, anhydrides such as polyazeleic anhydride and trimellitic anhydrides.

Curing can also be performed by mixing the polyester of this invention with amine functional materials to achieve lower temperature cure than may be obtained with the carboxyl functional materials noted above. Suitable curatives contain aliphatic primary and/or secondary amine groups. Such amine functional materials are aliphatic or cycloaliphatic in nature.

Examples of aliphatic amines include diamines such as ethanediamine, hexanediamine, 2-methyl-1,5-pentanediamine, and the like. They also include polyfunctional amines of the structure:

where n is commonly 1 to 3.

Examples of cycloaliphatic amines include cyclohexylamine, cyclohexanediamine, 4,4'-methylenebis-(cyclohexylamine), isophorone diamine, norbornaneamine, norbornanediamine, and the like.

Reaction products of the amines noted above can also be used as suitable curatives. Such reaction products include amidoamines formed by reacting the amines with mono-functional carboxylic acids (e.g. 1 part by weight tall oil fatty acid reacted with 1 part tetraethylenepentamine), polyamides formed by reacting the amines with multifunctional carboxylic acids, (or 2 parts by weight dimer fatty acid reacted with one part triethylene diamine), and amine adducts formed by reacting the amines with oxirane functional materials (e.g. 1 part by weight propylene oxide reacted with 1 part tetraethylenepentamine, or 5 parts by weight CARDURA-E10 reacted with 3 parts triethylenetetramine). A third example of an amine adduct would be to react the epoxy functional polyester described in this invention with an excess of a polyamine (such as diethylenetriamine), and then stripping the excess amine, leaving a polyester with is multifunctional in amine. Another example of an amine adduct would be to react an excess a polyamine (such as diethylenetriamine) with an aliphatic epoxide (such as the diglycidyl ether of hydrogenated bisphenol A),), and then stripping the excess amine, leaving a multifunctional in amine adduct.

It will be appreciated that according to the present invention in particular very attractive cured coatings can be obtained, which combine excellent outdoor durability and flexibility e.g. as compared with coatings derived from EPON 828 (EPON is a trademark).

The invention is further illustrated by the following examples, however without restricting its scope to these embodiments.

EXAMPLE 1
Preparation of polyglycidyl ester I 1,4-cyclohexanedicarboxylic acid (5 moles), dimethylolpropionic acid (4 moles) and VERSATIC 10 acid (2 moles) and xylene (3–5% wt on total intake) were charged in a round bottom glass reactor, equipped with a condenser, temperature control, nitrogen inlet, stirrer and vacuum inlet.

The mixture was then heated until the esterification reaction starts. The formed water was removed from the mixture by azeotropic distillation, until essentially all of the original hydroxyl groups have reacted. Subsequently, xylene was removed at temperatures below 200° C. (vacuum may be applied). The acid functional polyester thus formed was discharged and allowed to cool down to room temperature.

1250 g of this carboxyl functional polyester was dissolved in 4000 g of epichlorohydrin, 2500 g of isopropyl alcohol and 750 g of water. The mixture is heated to 80° C. under stirring.

0.15 mol NaOH/eq acid of the polyester was added as aqueous solution to the mixture and stirred until all acid groups are converted. After cooling the mixture to 55° C., 0.90 mol NaOH/eq acid of the polyester was added as an aqueous solution. After a post-reaction, and addition of extra water, the mixture was settled and drained.

Subsequently, the excess of ECH and the IPA were removed under vacuum, while increasing the temperature to 140° C. The crude resin was dissolved in methyl isobutyl keton and washed several times with water. After solvent removal, the product was discharged and allowed to cool down to room temperature.

The product obtained had the following properties:
Epoxy content=3200 mmol/kg.
Gardner Bubble Viscosity: Z6 or slightly higher (25° C.).

EXAMPLE 2
Preparation of polyglycidyl ester II 1,4-cyclohexanedicarboxylic acid (5 moles) and dimethylolpropionic acid (4 moles) were charged in a round bottom glass reactor, equipped with a condenser, temperature control, nitrogen inlet, stirrer and vacuum inlet.

The mixture was then heated to 150° C. The formed water was removed from the mixture by distillation, while the temperature of the reaction mixture was increased to 200° C. Vacuum was applied to speed up the reaction. The mixture was kept at 200° C. until essentially all of the original hydroxyl groups had reacted. After addition of 2.0 moles of VERSATIC 10 acid, the acid functional polyester thus formed was discharged and allowed to cool down to room temperature.

1250 g of this carboxyl functional polyester was dissolved in 4000 g of epichlorohydrin, 2500 g of isopropyl alcohol and 750 g of water. The mixture was heated to 80° C. under stirring.

0.15 mol NaOH/eq acid of the polyester was added as aqueous solution to the mixture and stirred until all acid groups are converted. After cooling the mixture to 55° C., 0.90 mol NaOH/eq acid of the polyester was added as an aqueous solution. After a post-reaction, and addition of extra water, the mixture was settled and drained.

Subsequently, the excess of ECH and the IPA were removed under vacuum, while increasing the temperature to 140° C. The crude resin was dissolved in methyl isobutyl keton and washed several times with water. After solvent removal, the product was discharged and allowed to cool down to room temperature.

The product obtained had the following properties:
Epoxy content=3100 mmol/kg.
Gardner Bubble Viscosity: Z6 or slightly higher (25° C.).

EXAMPLE 3
Preparation of polyglycidyl ester III 1,4-cyclohexanedicarboxylic acid (4 moles) and dimethylolpropionic acid (3 moles) and hydroxy pivalic acid (2 moles) were charged in a round bottom glass reactor, equipped with a condenser, temperature control, nitrogen inlet, stirrer and vacuum inlet.

The mixture was then heated to 150° C. The formed water was removed from the mixture by distillation, while the temperature of the reaction mixture was increased to 200° C. Vacuum was applied to speed up the reaction. The mixture was kept at 200° C. until essentially all of the original hydroxyl groups have reacted. After addition of 2.0 moles of VERSATIC 10 acid, the acid functional polyester thus formed was discharged and allowed to cool down to room temperature.

1250 g of this carboxyl functional polyester was dissolved in 4000 g of epichlorohydrin, 2500 g of isopropyl alcohol and 750 g of water. The mixture was heated to 80° C. under stirring.

0.15 mol NaOH/eq acid of the polyester was added as aqueous solution to the mixture and stirred until all acid groups are converted. After cooling the mixture to 55° C., 0.90 mol NaOH/eq acid of the polyester was added as an aqueous solution. After a post-reaction, and addition of extra water, the mixture was settled and drained.

Subsequently, the excess of ECH and the IPA were removed under vacuum, while increasing the temperature to 140° C. The crude resin was dissolved in methyl isobutyl keton and washed several times with water. After solvent removal, the product was discharged and allowed to cool down to room temperature.

The product obtained had the following properties:

Epoxy content=2900 mmol/kg.

Gardner Bubble Viscosity: Z5-Z6 (25° C.).

EXAMPLE 4
Preparation of polyglycidyl ester IV 1,4-cyclohexanedicarboxylic acid (4 moles), dimethylolpropionic acid (3 moles) and hydroxy pivalic acid (2 moles) were charged in a round bottom glass reactor, equipped with a condenser, temperature control, nitrogen inlet, stirrer and vacuum inlet.

The mixture was then heated to 150° C. The formed water was removed from the mixture by distillation, while the temperature of the reaction mixture was increased to 200° C. Vacuum is applied to speed up the reaction. The mixture was kept at 200° C. until essentially all of the original hydroxyl groups have reacted. The acid functional polyester thus formed was discharged and allowed to cool down to room temperature.

1250 g of this carboxyl functional polyester was dissolved in 4000 g of epichlorohydrin, 2500 g of isopropyl alcohol and 750 g of water. The mixture was heated to 80° C. under stirring.

0.15 mol NaOH/eq acid of the polyester was added as aqueous solution to the mixture and stirred until all acid groups are converted. After cooling the mixture to 55° C., 0.90 mol NaOH/eq acid of the polyester was added as an aqueous solution. After a post-reaction, and addition of extra water, the mixture was settled and drained.

Subsequently, the excess of ECH and the IPA were removed under vacuum, while increasing the temperature to 140° C. The crude resin was dissolved in methyl isobutyl keton and washed several times with water. After solvent removal, 389 g of CARDURA-E10 was added. Product was dumped at 100° C.

Epoxy content=2985 mmol/kg.

Gardner Bubble Viscosity: Z6 or slightly higher (25° C.).

EXAMPLE 5
Preparation of polyglycidyl ester V 1,4-cyclohexanedicarboxylic acid (4 moles), dimethylolpropionic acid (3 moles) and hydroxy pivalic acid (2 moles) were charged in a round bottom glass reactor, equipped with a condenser, temperature control, nitrogen inlet, stirrer and vacuum inlet.

The mixture was then heated to 150° C. The formed water was removed from the mixture by distillation, while the temperature of the reaction mixture was increased to 200° C. Vacuum was applied to speed up the reaction. The mixture was kept at 200° C. until essentially all of the original hydroxyl groups have reacted. The acid functional polyester thus formed was discharged and allowed to cool down to room temperature.

1250 g of this carboxyl functional polyester was dissolved in 4000 g of epichlorohydrin, 2500 g of isopropyl alcohol and 750 g of water. The mixture is heated to 80° C. under stirring.

0.15 mol NaOH/eq acid of the polyester was added as aqueous solution to the mixture and stirred until all acid groups are converted. After cooling the mixture to 55° C., 0.90 mol NaOH/eq acid of the polyester was added as an aqueous solution. After a post-reaction, and addition of extra water, the mixture was settled and drained.

Subsequently, the excess of ECH and the IPA were removed under vacuum, while increasing the temperature to 140° C. The crude resin was dissolved in methyl isobutyl keton and washed several times with water. After solvent removal, 518 g of CARDURA-E10 was added. Product was dumped at 100° C.

Epoxy content=3050 mmol/kg.

Gardner Bubble Viscosity : Z5-Z6 (25° C.).

EXAMPLE 6
Preparation of polyglycidyl ester VI 1,4-cyclohexanedicarboxylic acid (4 moles), dimethylolpropionic acid (3 moles) and hydroxy pivalic acid (2 moles) were charged in a round bottom glass reactor, equipped with a condenser, temperature control, nitrogen inlet, stirrer and vacuum inlet.

The mixture was then heated to 150° C. The formed water was removed from the mixture by distillation, while the temperature of the reaction mixture was increased to 200° C. Vacuum was applied to speed up the reaction. The mixture was kept at 200° C. until essentially all of the original hydroxyl groups have reacted. The acid functional polyester thus formed was discharged and allowed to cool down to room temperature.

1250 g of this carboxyl functional polyester was dissolved in 4000 g of epichlorohydrin, 2500 g of isopropyl alcohol and 750 g of water. The mixture was heated to 80° C. under stirring.

0.15 mol NaOH/eq acid of the polyester was added as aqueous solution to the mixture and stirred until all acid groups are converted. After cooling the mixture to 55° C., 0.90 mol NaOH/eq acid of the polyester was added as an aqueous solution. After a post-reaction, and addition of extra water, the mixture was settled and drained.

Subsequently, the excess of ECH and the IPA were removed under vacuum, while increasing the temperature to 140° C. The crude resin was dissolved in methyl isobutyl keton and washed several times with water. After solvent removal, 667 g of CARDURA-E10 was added. Product was dumped at 100° C.

Epoxy content=3115 mmol/kg.

Gardner Bubble Viscosity: Z3 (25° C.).

EXAMPLE 7
Preparation of polyglycidyl ester VII 1,4-cyclohexanedicarboxylic acid (4 moles), dimethylolpropionic acid (3 moles) and hydroxy pivalic acid (2 moles) were charged in a round bottom glass reactor, equipped with a condenser, temperature control, nitrogen inlet, stirrer and vacuum inlet.

The mixture was then heated to 150° C. The formed water was removed from the mixture by distillation, while the temperature of the reaction mixture was increased to 200° C. Vacuum was applied to speed up the reaction. The mixture was kept at 200° C. until essentially all of the original hydroxyl groups had reacted. The acid functional polyester thus formed was discharged and allowed to cool down to room temperature.

1250 g of this carboxyl functional polyester was dissolved in 4000 g of epichlorohydrin, 2500 g of isopropyl alcohol and 750 g of water. The mixture was heated to 80° C. under stirring.

0.15 mol NaOH/eq acid of the polyester was added as aqueous solution to the mixture and stirred until all acid groups are converted. After cooling the mixture to 55° C., 0.90 mol NaOH/eq acid of the polyester was added as an aqueous solution. After a post-reaction, and addition of extra water, the mixture was settled and drained.

Subsequently, the excess of ECH and the IPA were removed under vacuum, while increasing the temperature to 140° C. The crude resin was dissolved in methyl isobutyl keton and washed several times with water. After solvent removal, 1037 g of CARDURA-E10 was added. Product was dumped at 100° C.

Epoxy content=3250 mmol/kg.

Gardner Bubble Viscosity: X-Y Stokes (25° C.).

EXAMPLE 8

The reactivity of the liquid polyglycidylesters was examined by gelation time with Norbornanediamine (NBDA) equivalent ratio 1:1 at 100° C.

To assess cured resin properties the polyglycidylester and NBDA (ratio 1:1) were mixed at room temperature. After homogeneous the lacquers were applied on aluminium Q panels, with a bar coater and directly stoved at 80° C. for 30 min.

Reactivity and coating properties (film thickness ±65 microns) are listed in the Table below.

| System code | A | B | C | Reference |
|---|---|---|---|---|
| Composition | | | | |
| PGE example II | 326 | — | — | — |
| PGE example III | — | 345 | — | — |
| PGE example V | — | — | 328 | — |
| EPIKOTE 828 (EPIKOTE is a trademark) | — | — | — | 185 |
| NBDA | 38.5 | 38.5 | 38.5 | 38.5 |
| Gelation time | 150 | 175 | 250 | 150 |
| Coating properties | | | | |
| MEK resistance | >50 | >50 | >50 | >50 |
| Hardness, Konig | 180 | 140 | 160 | 225 |
| Reverse impact | >40<60 | >80 | >60<80 | 20 |
| Weathering resistance | good | good | good | very poor |

We claim:

1. A curable coating composition comprising a composition prepared by glycidating at least one (a) carboxy polyfunctional polyester prepared by reacting at a temperature of from 100° C. to 220° C. for a period of from 2 to 8 hours
   (i) at least one aromatic, aliphatic or cycloaliphatic dicarboxylic acid (B);
   (ii) at least one dihydroxymonocarboxylic acid (C) containing a tertiary aliphatic carboxyl group and two aliphatic hydroxyl groups which each independently is a primary or secondary hydroxyl group;
   (iii) optionally, one diol (D) containing two aliphatic hydroxyl groups which each independently is a primary or secondary hydroxyl group;
   (iv) optionally, an alcohol (A') containing one primary or secondary hydroxyl group and/or an alcohol (A") containing one primary or secondary hydroxyl group and one tertiary aliphatic carboxyl group;
   (v) optionally, a trifunctional hydroxyl compound (E) comprising three aliphatic hydroxyl groups which each independently is a primary or secondary hydroxyl group, and
   (vi) optionally, a tetrafunctional hydroxy compound (F) comprising four aliphatic hydroxyl groups which each independently is a primary or secondary hydroxyl group; the molar ratio of compound A':A":B:C:D:E:F being M:N:(X+Y+2P+3Q+1):X:Y:P:Q wherein
   M+N=0 to 4.
   Y ranges from 0 to 5,
   X ranges from 1 to 8,
   P ranges from 0 to 2, and
   Q ranges from 0 to 1,
   and at least one (b) α, α-branched monocarboxylic acid containing a tertiary carbon atom and from 5 to 12 carbon atoms or a glycidyl ester thereof, a curing agent, and optionally a catalyst.

2. The curable coating compositions of claim 1 comprising an amine functional material as curing agent.

3. The curable coating composition of claim 1 wherein the weight ratio between the carboxyl functional polyester or polyglycidyl ester thereof (a) and α,α-branched monocarboxylic acid or glycidyl ester thereof (b) is in the range from 19:1 to 1:1.

4. The curable coating composition of claim 1, said composition having an epoxy functionality $E_p F_{av}$ of from 1.5 to 3.5 and a viscosity in the range of from 1 to 15 Pa.s.

5. The curable coating composition of claim 4 comprising an amine functional material as curing agent.

6. A cured composition of claim 3.

7. A cured composition of claim 4.

8. A cured composition of claim 5.

9. A curable casting composition comprising a composition prepared by glycidating at least one (a) carboxy polyfunctional polyester prepared by reacting at a temperature of from 100° C. to 220° C. for a period of from 2 to 8 hours
   (i) at least one aromatic, aliphatic or cycloaliphatic dicarboxylic acid (B);
   (ii) at least one dihydroxymonocarboxylic acid (C) containing a tertiary aliphatic carboxyl group and two aliphatic hydroxyl groups which each independently is a primary or secondary hydroxyl group;
   (iii) optionally, one diol (D) containing two aliphatic hydroxyl groups which each independently is a primary or secondary hydroxyl group;
   (iv) optionally, an alcohol (A') containing one primary or secondary hydroxyl group and/or an alcohol (A") containing one primary or secondary hydroxyl group and one tertiary aliphatic carboxyl group;
   (v) optionally, a trifunctional hydroxyl compound (E) comprising three aliphatic hydroxyl groups which each independently is a primary or secondary hydroxyl group, and
   (vi) optionally, a tetrafunctional hydroxy compound (F) comprising four aliphatic hydroxyl groups which each independently is a primary or secondary hydroxyl group; the molar ratio of compound A':A":B:C:D:E:F being M:N:(X+Y+2P+3Q+1):X:Y:P:Q wherein
   M+N=0 to 4,
   Y ranges from 0 to 5,
   X ranges from 1 to 8,
   P ranges from 0 to 2, and
   Q ranges from 0 to 1,
   and at least one (b) α,α-branched monocarboxylic acid containing a tertiary carbon atom and from 5 to 12 carbon atoms or a glycidyl ester thereof, a curing agent, and optionally a catalyst.

10. The curable casting composition of claim 9 wherein said composition having an epoxy functionality $E_p F_{av}$ of from 1.5 to 3.5 and a viscosity in the range of from 1 to 15 Pa.s.

11. A cured composition of claim 9.

12. A cured composition of claim 10.

* * * * *